(12) United States Patent
Mackenzie et al.

(10) Patent No.: US 11,912,145 B2
(45) Date of Patent: Feb. 27, 2024

(54) MULTI-VOLTAGE ELECTRICAL ARCHITECTURES FOR ELECTRIFIED VEHICLES

(71) Applicant: FORD GLOBAL TECHNOLOGIES, LLC, Dearborn, MI (US)

(72) Inventors: Kevin Mackenzie, Canton, MI (US); Jonathan Barker, Ann Arbor, MI (US); Thomas J. Coupar, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 716 days.

(21) Appl. No.: 17/080,121

(22) Filed: Oct. 26, 2020

(65) Prior Publication Data

US 2022/0126712 A1 Apr. 28, 2022

(51) Int. Cl.
| | |
|---|---|
| *B60L 53/20* | (2019.01) |
| *B60L 50/60* | (2019.01) |
| *B60L 53/62* | (2019.01) |
| *B60L 1/00* | (2006.01) |
| *H02J 7/00* | (2006.01) |

(52) U.S. Cl.
CPC ............. *B60L 53/20* (2019.02); *B60L 1/00* (2013.01); *B60L 50/66* (2019.02); *B60L 53/62* (2019.02); *H02J 7/007* (2013.01); *H02J 7/0013* (2013.01); *H02J 7/0045* (2013.01); *B60L 2210/10* (2013.01); *H02J 2207/20* (2020.01)

(58) Field of Classification Search
CPC .. B60L 53/20; B60L 1/00; B60L 50/66; B60L 53/62; B60L 2210/10; B60L 2210/40; B60L 58/21; B60L 2240/527; B60L 53/22; B60L 53/11; B60L 53/00; H02J 7/0013; H02J 7/0045; H02J 7/007; H02J 2207/20; H02J 2310/48; Y02T 10/70; Y02T 10/7072; Y02T 10/72; Y02T 90/12; Y02T 90/14
See application file for complete search history.

(56) References Cited

U.S. PATENT DOCUMENTS

| 2012/0007557 A1 | 1/2012 | Hayashigawa | |
|---|---|---|---|
| 2013/0234664 A1* | 9/2013 | Marus | B60L 50/62 320/109 |

(Continued)

FOREIGN PATENT DOCUMENTS

| CN | 110014880 A | 7/2019 | |
|---|---|---|---|
| CN | 110303944 A | 10/2019 | |
| WO | WO-2019214824 A1 * | 11/2019 | B60L 58/10 |

OTHER PUBLICATIONS

JP4049959B2 with English translation. Filed Nov. 11, 1999. Date published Feb. 20, 2008. (Year: 2008).*

(Continued)

*Primary Examiner* — Calvin Cheung
(74) *Attorney, Agent, or Firm* — David B. Kelley; Carlson, Gaskey & Olds, P.C.

(57) ABSTRACT

This disclosure describes charging systems for electrified vehicles. Exemplary charging systems may employ a multi-voltage charging circuit that supports charging of a traction battery pack at both a first voltage level during a first charging condition and a second, different voltage level during a second charging condition. Higher voltage levels may be experienced during the second charging condition as compared to the first charging condition.

19 Claims, 5 Drawing Sheets

(56) References Cited

U.S. PATENT DOCUMENTS

| | | | | |
|---|---|---|---|---|
| 2015/0028808 | A1* | 1/2015 | Bernardi | B60L 58/22 |
| | | | | 320/109 |
| 2016/0355096 | A1* | 12/2016 | Herke | H02J 7/0045 |
| 2017/0110770 | A1* | 4/2017 | Marcicki | B60K 11/02 |
| 2019/0106011 | A1 | 4/2019 | Zacher et al. | |
| 2019/0109462 | A1* | 4/2019 | Götz | H01M 10/44 |
| 2019/0283611 | A1* | 9/2019 | Conlon | H02J 3/322 |

OTHER PUBLICATIONS

DE 102011005911 A1 with English translation. Date filed Mar. 22, 2011. Date published Sep. 27, 2012. (Year: 2012).*
DE 102018207536 A1 with English translation. Date filed May 15, 2018. Date published Nov. 21, 2019. (Year: 2019).*
C. Jung, "Power Up with 800-V Systems: The benefits of upgrading voltage power for battery-electric passenger vehicles," in IEEE Electrification Magazine, vol. 5, No. 1, pp. 53-58, Mar. 2017, doi: 10.1109/MELE.2016.2644560. (Year: 2017).*

* cited by examiner

MULTI-VOLTAGE ELECTRICAL ARCHITECTURES FOR ELECTRIFIED VEHICLES

TECHNICAL FIELD

This disclosure relates generally to electrified vehicles, and more particularly to multi-voltage charging circuits for supporting battery charging at different voltage levels.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port that is connectable to a charger coupler of an electric vehicle supply equipment (EVSE) for charging the traction battery pack.

SUMMARY

An electrified vehicle charging system according to an exemplary aspect of the present disclosure includes, among other things, a traction battery pack and a multi-voltage charging circuit configured to provide power to the traction battery pack at a first voltage level during a first charging condition and further configured to provide power to the traction battery pack at a second, different voltage level during a second charging condition.

In a further non-limiting embodiment of the foregoing electrified vehicle charging system, a first battery array and a second battery array of the traction battery pack are configured in parallel when the multi-voltage charging circuit provides the power at the first voltage level.

In a further non-limiting embodiment of either of the foregoing electrified vehicle charging systems, a first battery array and a second battery array of the traction battery pack are configured in series when the multi-voltage charging circuit provides the power at the second voltage level.

In a further non-limiting embodiment of any of the foregoing electrified vehicle charging systems, the first voltage level is a lower voltage level compared to the second voltage level.

In a further non-limiting embodiment of any of the foregoing electrified vehicle charging systems, the first voltage level is a 400V voltage level and the second voltage level is a 800V voltage level.

In a further non-limiting embodiment of any of the foregoing electrified vehicle charging systems, the first charging condition is a first DC fast charging event in which a 400V charger coupler is plugged into an inlet port of a charge port assembly. The second charging condition is a second DC fast charging event in which a 800V charger coupler is plugged into the inlet port.

In a further non-limiting embodiment of any of the foregoing electrified vehicle charging systems, the multi-voltage charging circuit includes a positive high voltage DC power line and a negative high voltage DC power line connected between a charge port assembly and the traction battery pack.

In a further non-limiting embodiment of any of the foregoing electrified vehicle charging systems, the multi-voltage charging circuit includes a first plurality of contactors and a second plurality of contactors.

In a further non-limiting embodiment of any of the foregoing electrified vehicle charging systems, a control system is configured to control a position of each of the first plurality of contactors and each of the second plurality of contactors during each of the first and second charging conditions.

In a further non-limiting embodiment of any of the foregoing electrified vehicle charging systems, the multi-voltage charging circuit includes a DC/DC converter configured to step down the second voltage level to the first voltage level for supporting auxiliary loads during the second charging condition.

A method according to another exemplary aspect of the present disclosure includes, among other things, supplying power to a traction battery pack of an electrified vehicle at a first voltage level during a first DC fast charging condition, and supplying the power to the traction battery pack at a second, different voltage level during a second DC fast charging condition.

In a further non-limiting embodiment of the foregoing method, the second voltage level is a larger voltage level compared to the first voltage level.

In a further non-limiting embodiment of either of the foregoing methods, the first voltage level is a 400V voltage level and the second voltage level is a 800V voltage level.

In a further non-limiting embodiment of any of the foregoing methods, while supplying the power during the first DC fast charging condition, a first battery array and a second battery array of the traction battery pack are configured in parallel with one another, and while supplying the power during the second DC fast charging condition, the first battery array and the second battery array are configured in series with one another.

In a further non-limiting embodiment of any of the foregoing methods, the first DC fast charging condition is a lower voltage DC fast charging event in which a first charger coupler is plugged into an inlet port of a charge port assembly. The second DC fast charging condition is a higher voltage DC fast charging event in which a second charger coupler is plugged into the inlet port.

In a further non-limiting embodiment of any of the foregoing methods, the method includes supplying the power at the second voltage level to a DC/DC converter during the second DC fast charging condition, stepping down the second voltage level to the first voltage level via the DC/DC converter, and powering an auxiliary load with the first voltage level during the second DC fast charging condition.

In a further non-limiting embodiment of any of the foregoing methods, the method includes bypassing the DC/DC converter during the first DC fast charging condition, and powering the auxiliary load with the first voltage level during the first DC fast charging condition.

In a further non-limiting embodiment of any of the foregoing methods, the method includes, prior to supplying the power, detecting what type of a charger coupler of an electric vehicle supply equipment is plugged into an inlet port of a charge port assembly of the electrified vehicle.

In a further non-limiting embodiment of any of the foregoing methods, supplying the power at the first voltage level during the first DC fast charging condition includes closing a first plurality of contactors of a multi-voltage charging circuit and opening a second plurality of contactors of the multi-voltage charging circuit.

In a further non-limiting embodiment of any of the foregoing methods, supplying the power at the second voltage level during the second DC fast charging condition includes opening the first plurality of contactors and closing the second plurality of contactors.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes charging systems for electrified vehicles. Exemplary charging systems may employ a multi-voltage charging circuit that supports charging of a traction battery pack at both a first voltage level during a first charging condition and a second, different voltage level during a second charging condition. Higher voltage levels may be experienced during the second charging condition as compared to the first charging condition. These and other features of this disclosure are discussed in greater detail in the following paragraphs of this detailed description.

Figure 1:
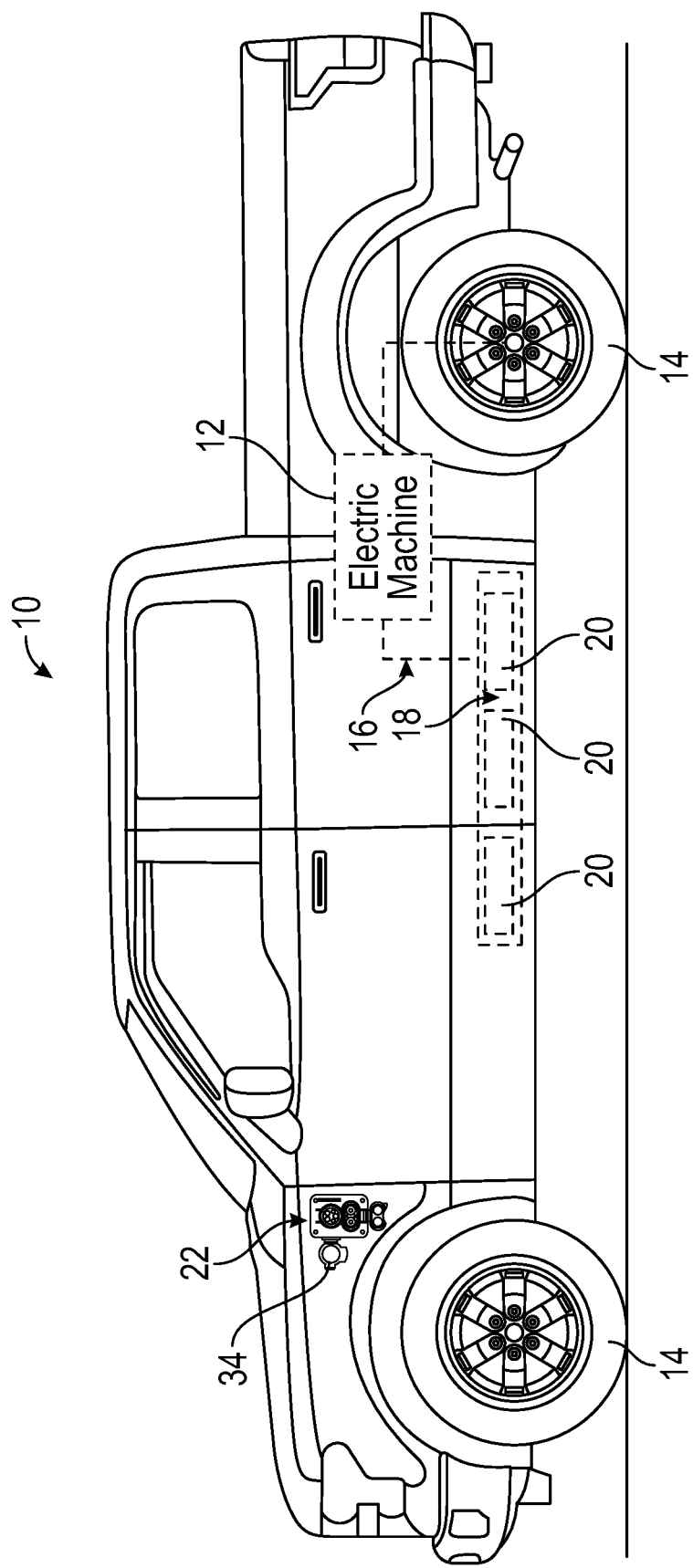
FIG. 1 is a side view of an electrified vehicle equipped with a charge port assembly.
Figure 2:
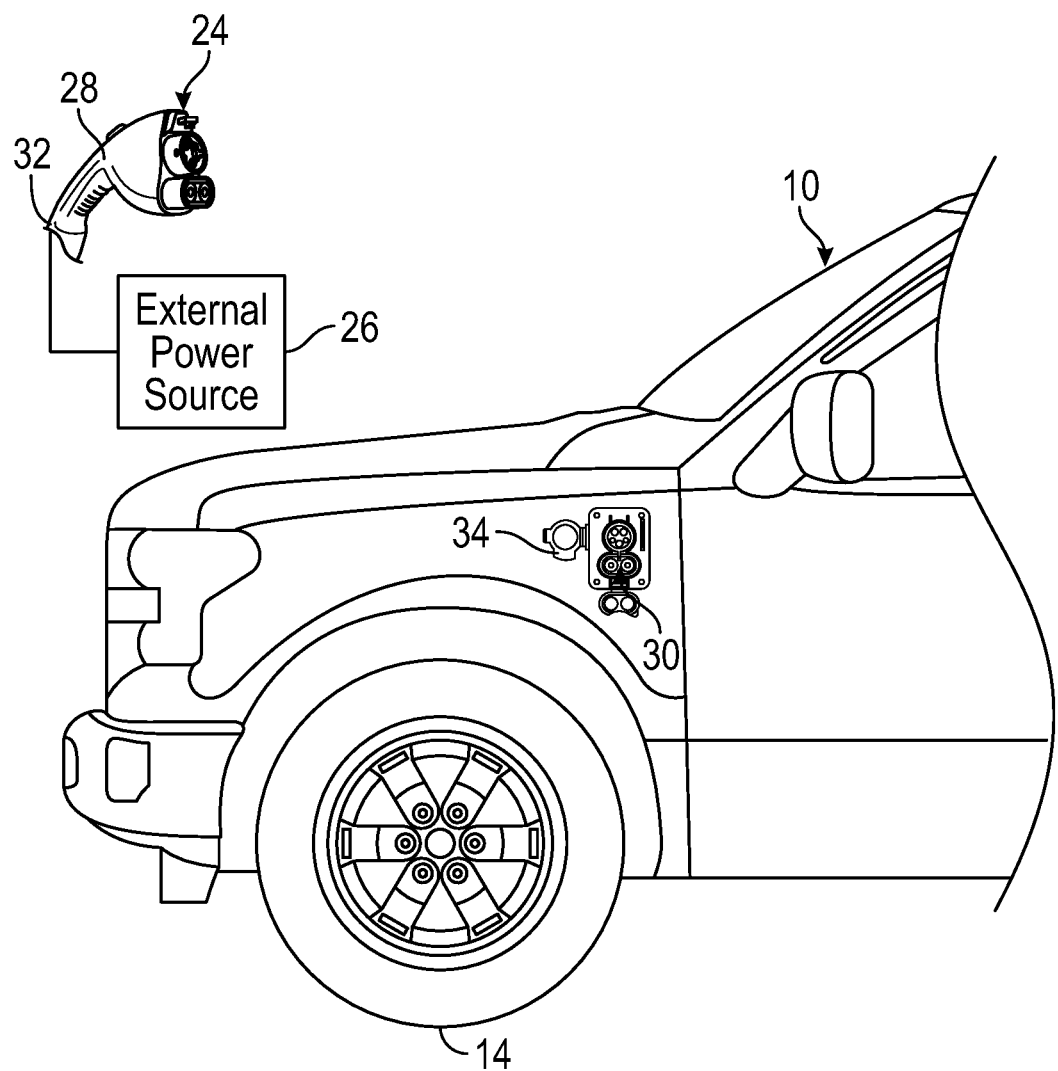
FIG. 2 is a blown-up view of the charge port assembly of the electrified vehicle of FIG. 1.

FIGS. 1 and 2 schematically illustrate an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, plug-in hybrid electric vehicles (PHEV's), etc. Therefore, although not specifically shown in this embodiment, the electrified vehicle 10 could be equipped with an internal combustion engine that can be employed either alone or in combination with other energy sources to propel the electrified vehicle 10.

In an embodiment, the electrified vehicle 10 is a pickup truck. However, the electrified vehicle 10 could also be a car, a van, a sport utility vehicle, or any other type of vehicle. Thus, although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A high voltage bus 16 electrically connects the electric machine 12 to a traction battery pack 18. The traction battery pack 18 is an exemplary electrified vehicle traction battery. The traction battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10

From time to time, charging the energy storage devices of the traction battery pack 18 may be required or desirable. The electrified vehicle 10 may therefore be equipped with a charge port assembly 22 (sometimes referred to as a vehicle inlet assembly) for charging the energy storage devices (e.g., battery cells) of the traction battery pack 18. Electric vehicle supply equipment (EVSE) 24 may be operably connected between the charge port assembly 22 and an external power source 26 for transferring power therebetween. In an embodiment, the external power source 26 includes utility grid power. In another embodiment, the external power source 26 includes an alternative energy source, such as solar power, wind power, etc. In yet another embodiment, the external power source 26 includes a combination of utility grid power and alternative energy sources. The external power source 26 may be located at a home of the user, a public charging station, etc.

The EVSE 24 may include a charger coupler 28 that can be coupled to an inlet port 30 of the charge port assembly 22 to charge the traction battery pack 18 of the electrified vehicle 10 from the external power source 26. A cable 32 of the EVSE 24 may connect between the charger coupler 28 and a power outlet or charging station that is operably connected to the external power source 26.

The charge port assembly 22 may include a charge port door 34 that is closed during typical operation of the electrified vehicle 10. When charging the electrified vehicle 10 from the external power source 26 is desired, the charge port door 34 can move from the closed position shown in FIG. 1 to the open position shown in FIG. 2. A user can then connect the charger coupler 28 of the EVSE 24 to the inlet port 30 of the charge port assembly 22 so that power from the external power source 26 can be provided to the traction battery pack 18 of the electrified vehicle 10 for charging the battery cells contained therein.

The inlet port 30 of the exemplary charge port assembly 22 may be configured to receive AC power from the external power source 26. In another embodiment, the inlet port 30 of the charge port assembly 22 is configured to receive DC power from the external power source 26. In yet another example, the inlet port 30 is a combined AC/DC charge port that is configured to receive AC power, DC power, or both from the external power source 26. The EVSE 24 may thus be configured to provide any level of charging (e.g., level 1, level 2, DC fast charging, etc.).

Speed of charging is a common issue associated with charging electrified vehicles. As vehicle traction batteries become larger and larger, more power is required to charge the traction battery packs in the same amount of time. Moreover, the current levels required to meet the increased power requirements have practical limitations in terms of cable size, etc. This disclosure therefore describes charging systems equipped with multi-voltage charging circuits that enable charging at multiple different voltage levels without significantly modifying existing electric powertrain hardware.

Figure 3:
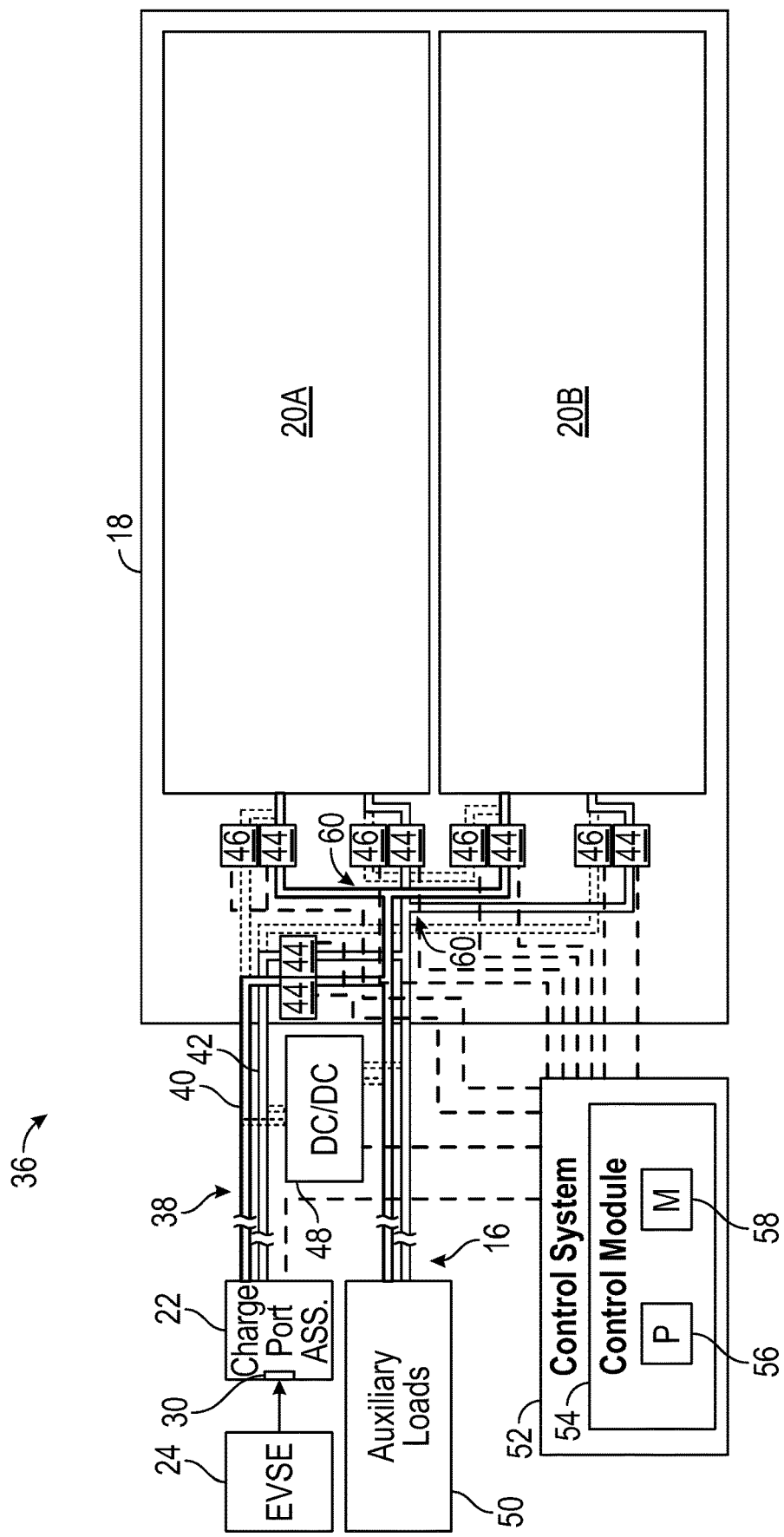
FIG. 3 schematically illustrates operation of a multi-voltage charging circuit during a first charging condition of an electrified vehicle.
Figure 4:
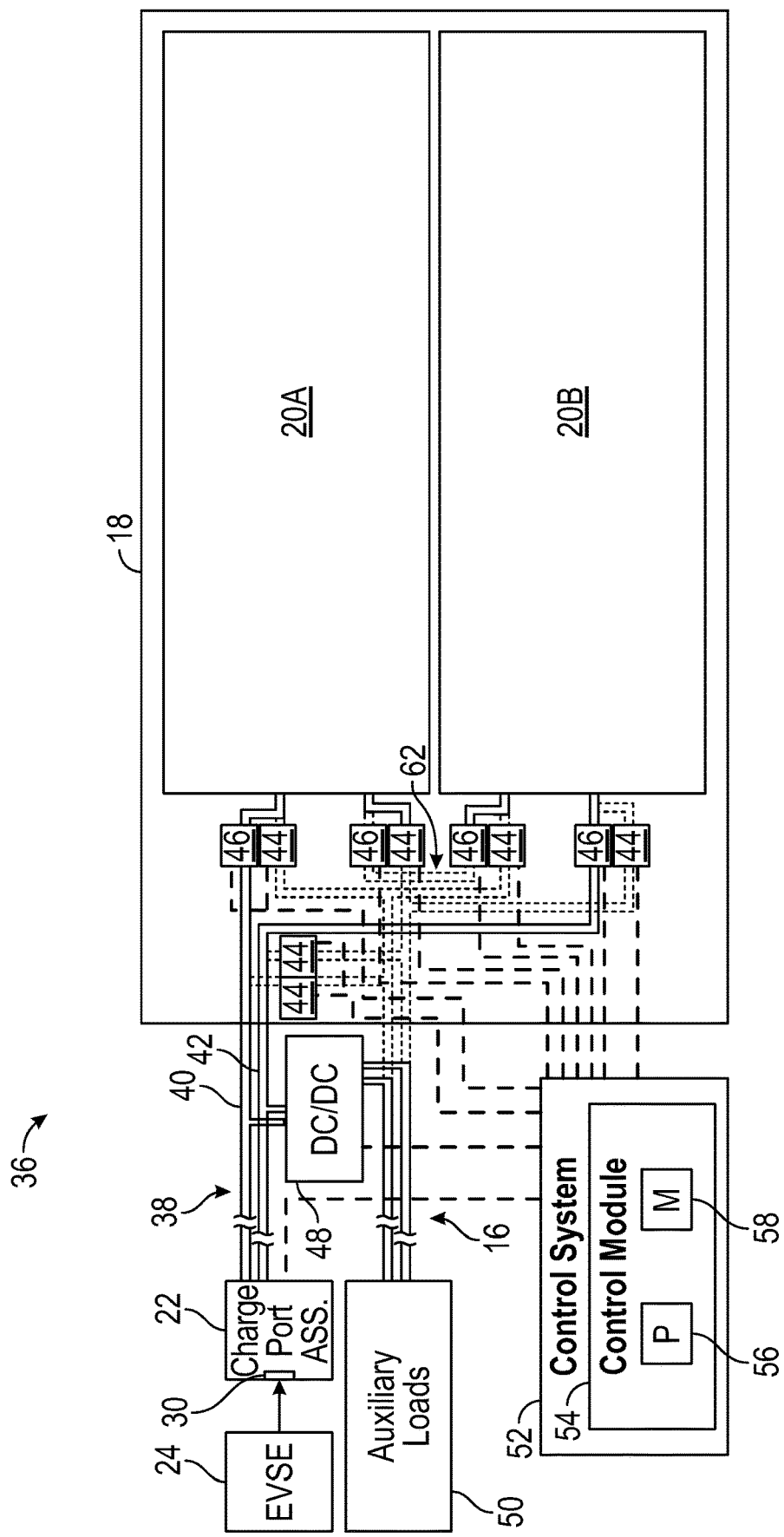
FIG. 4 schematically illustrates operation the multi-voltage charging circuit of FIG. 3 during a second charging condition of the electrified vehicle.

FIGS. 3 and 4 illustrate an exemplary charging system 36 for the electrified vehicle 10 of FIG. 1. As further detailed below, the charging system 36 may include a multi-voltage charging circuit 38 configured for supplying power to the traction battery pack 18 at two or more different voltage levels.

In an embodiment, the traction battery pack 18 includes a first battery array 20A positioned adjacent to a second battery array 20B. However, it should be understood that the traction battery pack 18 could include a greater number of battery arrays within the scope of this disclosure. The energy storage devices (e.g., battery cells) of the first and second battery arrays 20A, 20B may be charged by the multi-voltage charging circuit 38 of the charging system 36.

The multi-voltage charging circuit 38 may include an arrangement of high voltage (HV) direct current (DC) power lines for transferring power between the charge port assembly 22 and the traction battery pack 18 during DC fast charging events. The power lines may include positive HV DC power lines 40 and negative HV DC power lines 42.

A first plurality of contactors 44 and a second plurality of contactors 46 may be arranged within the positive and negative HV DC power lines 40, 42 for controlling the flow of current within the multi-voltage charging circuit 38 during the DC fast charging events. The contactors 44, 46 may also be referred to as electrically controlled switches. The total number of the first and second plurality of contactors 44, 46 provided within the multi-voltage charging circuit 38 is not intended to limit this disclosure.

The first plurality of contactors 44 may be actuated (e.g. switched) to a closed position to permit the flow of current of a first voltage level along a pathway within the multi-voltage charging circuit 38 for charging the traction battery pack 18 during a first charging condition, and the second plurality of contactors 46 may be actuated (e.g., switched) to a closed position to permit the flow of current of a second voltage level along another pathway of the multi-voltage charging circuit 38 for charging the traction battery pack 18 during a second charging condition. In general, the first charging condition is a lower voltage charging condition and the second charger condition is a higher voltage charging condition. In an embodiment, the first voltage level is a 400V voltage level and the first charging condition is a 400V DC fast charging event in which a 400V charger coupler of the EVSE 24 is plugged into the inlet port 30 of the charge port assembly 22, and the second voltage level is a 800V voltage level and the second charging condition is a 800V DC fast charging event in which a 800V charger coupler of the EVSE 24 is plugged into the inlet port 30 of the charge port assembly 22. However, other voltage levels and associated charging conditions are further contemplated within the scope of this disclosure. Moreover, more than two voltage levels could be provided.

The multi-voltage charging circuit 38 may additionally include a DC/DC converter 48 for supporting auxiliary loads 50 during the second charging condition. The DC-DC converter 48 may be configured to adjust an input voltage received from the charge port assembly 22 to a different output voltage that is compatible with the auxiliary loads 50, which are located on the high voltage bus 16 of the electrified vehicle 10. In an embodiment, the auxiliary loads 50 may include climate control loads or any other loads that may need powered during DC fast charging events.

In an embodiment, the DC-DC converter 48 is a step-down converter that is configured to decrease the input voltage received from the charge port assembly 22 to a lower output voltage for powering the auxiliary loads 50 during the second charging condition. For example, the DC-DC converter 48 may reduce the voltage from a higher voltage level (e.g., 800V) to a lower voltage level (e.g., 400V) that is compatible with the auxiliary loads 50.

A control system 52 may control various operations associated with the multi-voltage charging circuit 38 for controlling the transfer of power between the charge port assembly 22 and the traction battery pack 18 during the first and second charging events. The control system 52 may be part of an overall vehicle control system or could be a separate control system that communicates with the vehicle control system. The control system 52 may include one or more control modules 54 equipped with executable instructions for interfacing with and commanding operation of various components of the multi-voltage charging circuit 38. Each control module 54 of the control system 52 includes a processing unit 56 and non-transitory memory 58 for executing the various control strategies and modes of the multi-voltage charging circuit 38.

Operation of the multi-voltage charging circuit 38 during the first, lower voltage level charging condition is schematically illustrated in FIG. 3. In FIGS. 3 and 4, solid lines indicate sections of the positive HV DC power lines 40 and the negative HV DC power lines 42 where current is permitted to flow, and dashed lines indicate sections of the positive HV DC power lines 40 and the negative HV DC power lines 42 where current is not permitted to flow during a given charging condition.

The control system 52 may monitor a status of the inlet port 30 of the charge port assembly 22 to determine the type of charger coupler of the EVSE 24 that is coupled thereto. When the control system 52 determines that a lower voltage (e.g., 400V) charger coupler is coupled to the inlet port 30, the control system 52 may command the first plurality of contactors 44 closed and the second plurality of contactors 46 open. The first battery array 20A and the second battery array 20B are therefore connected in parallel to one another and each may simultaneously receive current of a first voltage level (e.g., 400V) from the charge port assembly 22. The power may be communicated within junctions 60 of the positive HV DC power lines 40 and the negative HV DC power lines 42. The junctions 60 connect to both the first battery array 20A and the second battery array 20B for simultaneously communicating power thereto.

Power may also be supplied to the high voltage bus 16 from the charge port assembly 22 for powering the auxiliary loads 50 without first passing the power through the DC/DC converter 48 during the first charging condition. In other words, the DC/DC converter 48 may be bypassed during the first charging condition since the current is already at a voltage level that is compatible with the auxiliary loads 50.

Operation of the multi-voltage charging circuit 38 during the second, higher voltage charging condition is schematically illustrated in FIG. 4. When the control system 52 determines that a higher voltage (e.g., 800V) charger coupler of the EVSE 24 is coupled to the inlet port 30 of the charge port assembly 22, the control system 52 may command the first plurality of contactors 44 open and the second plurality of contactors 46 closed. The first battery array 20A and the second battery array 20B are therefore connected in series for receiving current of a second voltage level (e.g., 800V) from the charge port assembly 22. The power may thus be communicated within the positive HV DC power lines 40 and the negative HV DC power lines 42 from the charge port assembly 22 directly to the first battery array 20A and then from the first battery array 20A to the second battery array 20B within a junction 62 that connects the first and second battery arrays 20A, 20B.

Power received from the charge port assembly 22 may also be supplied to the DC/DC converter 48 during the second charging condition. The DC-DC converter 48 may reduce the voltage from the higher voltage level (e.g., 800V) to the lower voltage level (e.g., 400V) that is compatible with the auxiliary loads 50.

Figure 5:
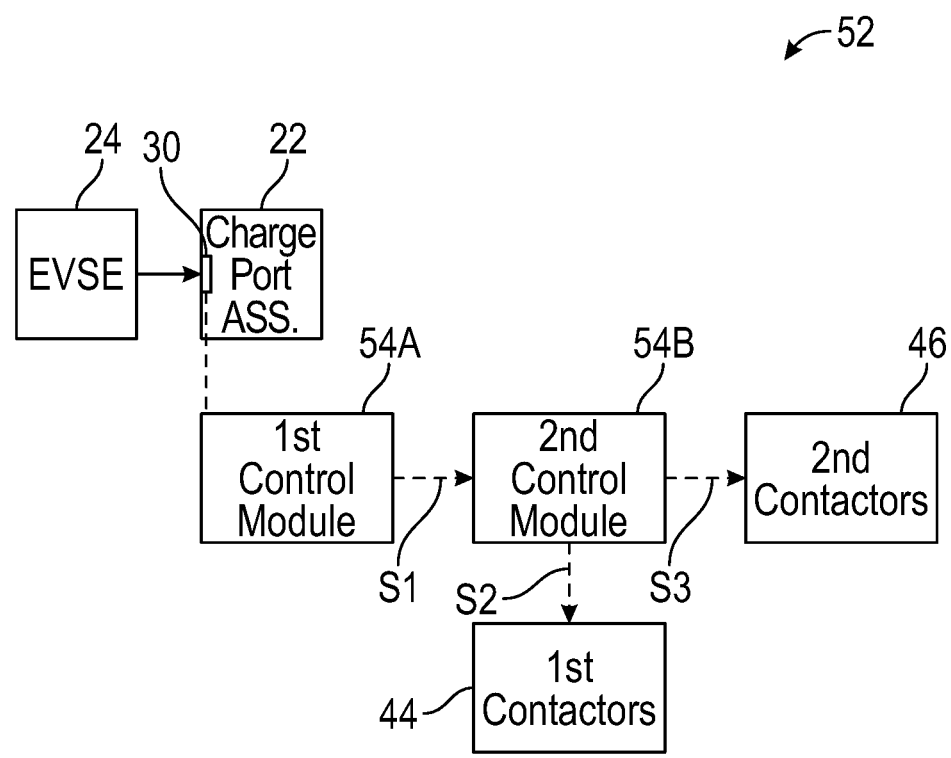
FIG. 5 schematically illustrates an exemplary control system for controlling the multi-voltage charging circuit of FIGS. 3 and 4.

FIG. 5 schematically illustrates an exemplary control system 52 that can be employed for controlling operations of the multi-voltage charging circuit 38 described above. In this embodiment, the control system 52 includes a first control module 54A (e.g., an on-board charging controller) and a second control module 54B (e.g., a battery control module). The first control module 54A and the second control module 54B may communicate with one another over a controller area network, for example.

In an exemplary embodiment, the first control module 54A is configured to monitor a status of the inlet port 30 of the charge port assembly 22 to determine the type of charger coupler of the EVSE 24 that is coupled thereto. In response to determining the type of charger coupler that is plugged into the inlet port 30, the first control module 54A may communicate a charge information signal S1 to the second control module 54B. The second control module 54B may then communicate the appropriate command signals S2, S3 to the first plurality of contactors 44 and the second plurality of contactors 46, respectively, based on the charge information signal S1 received from the first control module 54A. For example, when the charge information signal S1 indicates that a 400V DC fast charger is coupled to the inlet port 30, the second control module 54B may command the first plurality of contactors 44 closed and the second plurality of contactors 46 open to arrange the first and second battery arrays 20A, 20B in parallel, and when the charge information signal S1 indicates that a 800V DC fast charger is coupled to the inlet port 30, the second control module 54B may command the first plurality of contactors 44 open and the second plurality of contactors 46 closed to arrange the first and second battery arrays 20A, 20B in series.

The electrified vehicle charging systems of this disclosure employ a multi-voltage charging circuit that is configured for supplying power to the traction battery pack at two different voltage levels depending on the power levels being supplied to the vehicle charge port assembly during DC fast charging events. The unique architecture afforded by the multi-voltage charging circuits described herein allows for charging at higher power levels while avoiding the need to modify existing electric powertrain hardware (e.g., motors and accessories).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle charging system, comprising:
a traction battery pack; and
a multi-voltage charging circuit configured to provide power to the traction battery pack at a first voltage level during a first charging condition and further configured to provide power to the traction battery pack at a second, different voltage level during a second charging condition,
wherein the first charging condition is a first DC fast charging event in which a first charger coupler is plugged into an inlet port of a charge port assembly, and the second charging condition is a second DC fast charging event in which a second charger coupler is plugged into the inlet port.

2. The electrified vehicle charging system as recited in claim 1, wherein a first battery array and a second battery array of the traction battery pack are configured in parallel when the multi-voltage charging circuit provides the power at the first voltage level.

3. The electrified vehicle charging system as recited in claim 1, wherein a first battery array and a second battery array of the traction battery pack are configured in series when the multi-voltage charging circuit provides the power at the second voltage level.

4. The electrified vehicle charging system as recited in claim 1, wherein the first voltage level is a lower voltage level compared to the second voltage level.

5. The electrified vehicle charging system as recited in claim 4, wherein the first voltage level is a 400V voltage level and the second voltage level is a 800V voltage level.

6. The electrified vehicle charging system as recited in claim 1, wherein the first charger coupler is a 400V charger coupler and the second charger coupler is a 800V charger coupler.

7. The electrified vehicle charging system as recited in claim 1, wherein the multi-voltage charging circuit includes a positive high voltage DC power line and a negative high voltage DC power line connected between a charge port assembly and the traction battery pack.

8. The electrified vehicle charging system as recited in claim 1, wherein the multi-voltage charging circuit includes a first plurality of contactors and a second plurality of contactors.

9. The electrified vehicle charging system as recited in claim 8, comprising a control system configured to control a position of each of the first plurality of contactors and each of the second plurality of contactors during each of the first and second charging conditions.

10. An electrified vehicle charging system, comprising:
a traction battery pack; and
a multi-voltage charging circuit configured to provide power to the traction battery pack at a first voltage level during a first charging condition and further configured to provide power to the traction battery pack at a second, different voltage level during a second charging condition, wherein the multi-voltage charging circuit includes a DC/DC converter configured to step down the second voltage level to the first voltage level for supporting auxiliary loads during the second charging condition.

11. A method, comprising:

supplying power to a traction battery pack of an electrified vehicle at a first voltage level during a first DC fast charging condition; and supplying the power to the traction battery pack at a second, different voltage level during a second DC fast charging condition, wherein the second voltage level is a larger voltage level compared to the first voltage level.

12. The method as recited in claim 11, wherein the first voltage level is a 400V voltage level and the second voltage level is a 800V voltage level.

13. The method as recited in claim 11, wherein:

while supplying the power during the first DC fast charging condition, a first battery array and a second battery array of the traction battery pack are configured in parallel with one another; and while supplying the power during the second DC fast charging condition, the first battery array and the second battery array are configured in series with one another.

14. The method as recited in claim 11, wherein the first DC fast charging condition is a lower voltage DC fast charging event in which a first charger coupler is plugged into an inlet port of a charge port assembly, and further wherein the second DC fast charging condition is a higher voltage DC fast charging event in which a second charger coupler is plugged into the inlet port.

15. The method as recited in claim 11, comprising:

supplying the power at the second voltage level to a DC/DC converter during the second DC fast charging condition;

stepping down the second voltage level to the first voltage level via the DC/DC converter; and powering an auxiliary load with the first voltage level during the second DC fast charging condition.

16. The method as recited in claim 15, comprising:

bypassing the DC/DC converter during the first DC fast charging condition; and powering the auxiliary load with the first voltage level during the first DC fast charging condition.

17. The method as recited in claim 11, comprising, prior to supplying the power:

detecting what type of a charger coupler of an electric vehicle supply equipment is plugged into an inlet port of a charge port assembly of the electrified vehicle.

18. The method as recited in claim 11, wherein supplying the power at the first voltage level during the first DC fast charging condition includes closing a first plurality of contactors of a multi-voltage charging circuit and opening a second plurality of contactors of the multi-voltage charging circuit.

19. The method as recited in claim 18, wherein supplying the power at the second voltage level during the second DC fast charging condition includes opening the first plurality of contactors and closing the second plurality of contactors.

\* \* \* \* \*